US010476671B2

(12) United States Patent
Park et al.

(10) Patent No.: US 10,476,671 B2
(45) Date of Patent: Nov. 12, 2019

(54) METHOD AND DEVICE FOR INSTALLING PROFILE OF EUICC

(71) Applicant: Samsung Electronics Co., Ltd., Suwon-si, Gyeonggi-do (KR)

(72) Inventors: Jonghan Park, Bucheon-si (KR); Duckey Lee, Seoul (KR); Sangsoo Lee, Yongin-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 15/325,649

(22) PCT Filed: Jul. 10, 2015

(86) PCT No.: PCT/KR2015/007215
§ 371 (c)(1),
(2) Date: Jan. 11, 2017

(87) PCT Pub. No.: WO2016/010312
PCT Pub. Date: Jan. 21, 2016

(65) Prior Publication Data
US 2017/0155507 A1 Jun. 1, 2017

(30) Foreign Application Priority Data
Jul. 17, 2014 (KR) .................. 10-2014-0090591

(51) Int. Cl.
*H04W 12/04* (2009.01)
*H04L 9/08* (2006.01)
(Continued)

(52) U.S. Cl.
CPC ......... *H04L 9/0822* (2013.01); *H04B 1/3816* (2013.01); *H04L 9/0861* (2013.01);
(Continued)

(58) Field of Classification Search
CPC ... H04L 9/0822; H04L 63/062; H04L 63/102; H04W 12/04
See application file for complete search history.

(56) References Cited

U.S. PATENT DOCUMENTS 9,451,459 B2    9/2016 Lee et al.
2008/0065889 A1*  3/2008 Greco ............... H04L 63/062
                                              713/171
(Continued)

FOREIGN PATENT DOCUMENTS

CN    102595404 A    7/2012
CN    103546886 A    1/2014
(Continued)

OTHER PUBLICATIONS

Park et al. Secure Profile Provisioning Architecture for Embedded UICC 2013 International Conference on Availability, Reliability and Security (Year: 2013).*
(Continued)

*Primary Examiner* — David J Pearson
(74) *Attorney, Agent, or Firm* — Jefferson IP Law, LLP

(57) ABSTRACT

The present disclosure relates to a method and a device for installing a profile of an embedded universal integrated circuit boards (eUICC) and, more particularly, to a method and a device for remotely installing mobile communication subscriber information (profile) substituting for a universal integrated circuit boards (UICC), on a security module. In an aspect, a network device, acquires at least one of or more profiles encrypted with a first password key and one or more first password keys encrypted with a second password key; and when profile installation for the eUICC starts, transmits to, at least one eUICC, the one or more encrypted profiles and the one or more encrypted first password keys, wherein, prior to the transmission, each first password key is re-
(Continued)

encrypted with a third password key for installation by the corresponding one or more eUICCs.

14 Claims, 7 Drawing Sheets

(51) Int. Cl.
| | |
|---|---|
| *H04W 8/18* | (2009.01) |
| *H04W 88/18* | (2009.01) |
| *H04W 12/00* | (2009.01) |
| *H04B 1/3816* | (2015.01) |
| *H04L 29/06* | (2006.01) |

(52) U.S. Cl.
CPC ........... *H04L 63/0428* (2013.01); *H04W 8/18* (2013.01); *H04W 12/0017* (2019.01); *H04W 12/0023* (2019.01); *H04W 12/00401* (2019.01); *H04W 12/04* (2013.01); *H04W 88/18* (2013.01)

(56) References Cited

U.S. PATENT DOCUMENTS

| | | | | |
|---|---|---|---|---|
| 2012/0108205 | A1* | 5/2012 | Schell | H04L 63/0823 455/411 |
| 2012/0108207 | A1 | 5/2012 | Stephan et al. | |
| 2012/0190354 | A1 | 7/2012 | Merrien et al. | |
| 2012/0260086 | A1* | 10/2012 | Haggerty | H04W 8/265 713/150 |
| 2012/0260090 | A1 | 10/2012 | Hauck et al. | |
| 2013/0227646 | A1* | 8/2013 | Haggerty | H04L 63/0853 726/3 |
| 2013/0283047 | A1 | 10/2013 | Merrien et al. | |
| 2014/0024343 | A1 | 1/2014 | Bradley | |
| 2014/0140507 | A1 | 5/2014 | Park et al. | |
| 2014/0165155 | A1 | 6/2014 | Zhang | |
| 2014/0219447 | A1 | 8/2014 | Park et al. | |
| 2014/0349617 | A1 | 11/2014 | Li et al. | |
| 2016/0127132 | A1* | 5/2016 | Lee | H04L 9/0819 713/156 |

FOREIGN PATENT DOCUMENTS

| | | |
|---|---|---|
| EP | 2461613 A1 | 7/2012 |
| JP | 2014-500678 A | 1/2014 |
| JP | 2015-512209 A | 4/2015 |
| JP | 2015-522976 A | 8/2015 |
| JP | 2016-500491 A | 1/2016 |
| KR | 10-2013-0006258 A | 1/2013 |
| KR | 10-2013-0026351 A | 3/2013 |
| WO | 2012-017059 A1 | 2/2012 |
| WO | 2013/036010 A1 | 3/2013 |
| WO | 2013/036011 A2 | 3/2013 |

OTHER PUBLICATIONS

European Search Report dated Mar. 7, 2018, issued in European Application No. 15821440.3-1214.
Japanese office action dated Feb. 18, 2019; Application # 2017-502860.
Chinese Office Action dated Aug. 22, 2019, Issued in Chinese Application No. 201580037883.6.

* cited by examiner

METHOD AND DEVICE FOR INSTALLING PROFILE OF EUICC

TECHNICAL FIELD

The present disclosure relates to a method and a device for installing a profile of an eUICC (embedded Universal Integrated Circuit Card) and, more particularly, to a method and a device for installing mobile communication subscriber information (profile) in a security module remotely by replacing a UICC (Universal Integrated Circuit Card) with the eUICC.

BACKGROUND ART

A UICC (Universal Integrated Circuit Card) is a smart card being inserted into a mobile communication terminal and stores personal information such as network connection authentication information, telephone numbers, and SMS of a mobile communication subscriber. The UICC enables safe use of mobile communication by performing subscriber authentication and generating a traffic security key when connected to a mobile communication network such as a GSM, WCDMA, and LTE.

Communication applications such as a SIM, USIM, and ISIM are launched into the UICC according to the type of the mobile communication network connected by a subscriber. Further, the UICC provides an upper level security function for launching various applications such as an electronic wallet, ticketing, and electronic passport.

Conventional UICCs are manufactured as a dedicated card for a specific mobile communication provider according to a request from the mobile communication provider. Accordingly, the UICC is released by pre-installing authentication information for connecting to a network of a corresponding provider (for example, IMSI and K value of a USIM application). The manufactured UICC is delivered to a corresponding mobile communication provider and provided for a subscriber, and if necessary, management of installing, modifying, and deleting an application in the UICC can be performed by using a technology such as an OTA (Over The Air). The subscriber can use network and application services of the corresponding mobile communication provider by inserting the UICC into a mobile communication terminal owned by the subscriber, and if the terminal is replaced by a new one, the subscriber can use the existing authentication information, telephone numbers for mobile communication, and personal telephone book by inserting the UICC into the new terminal.

Physical specifications and logical functions of the UICC are defined by a standardization organization of ETSI (European Telecommunications Standards Institute) which provides international compatibility. In the view of physical specification, a form factor of the UICC has been gradually decreased from a Mini SIM used most widely, to a Micro SIM used from several years ago, and further to a Nano SIM released recently. This contributes much to miniaturization of the mobile communication terminal.

Recently, a UICC smaller than the Nano SIM has been established, however it may be difficult to be standardized because a loss of UICC is concerned. It may be difficult to miniaturize the UICC further more because a space for installing a slot is required for a terminal when considering characteristics of a detachable UICC.

Further, the conventional UICC is not suitable for M2M (Machine-to-Machine) equipment which performs a connection to a mobile communication data network without a direct operation of a person in various installation environment of an intelligent home appliance, electric/water meter, and CCTV camera.

In order to solve such a problem, replacement of the conventional UICC is required, and a security module having a similar function to that of the UICC is integrated into a mobile communication terminal in a production process.

The internal security module developed according to such a requirement is a security module installed in a terminal, however it cannot launch network connection authentication information of a specific mobile communication provider such as an IMSI and a K value of a USIM while manufacturing the terminal. Accordingly, the authentication information of the terminal internal security module can be set by a user after buying a terminal launched with a corresponding internal security module and becoming a subscriber of a specific mobile communication provider.

In a network supporting a newly developed terminal having an internal security module, if the terminal connects to a certain mobile communication network by provisioning a profile, a profile providing server encrypts the profile by using a session key generated by mutual authentication with the terminal in real time and transmits the encrypted profile to the terminal. A hardware security module installed in a profile providing server for encrypting a profile may be suitable for encrypting a small number of profiles in real time, however, if a large number of terminals is to receive profiles for the terminal having an internal security module, it may be impossible to provide the profiles because all the profiles must be encrypted at the same time. Accordingly, technical difficulties can be generated when provisioning profiles for a large number of terminals having an internal security module.

Further, there is a problem that correct profiles cannot be provided for some terminals if an external network state of connecting the large number of terminals having an internal security module to a SM-DP (Subscription Manager Data Preparation) server is poor.

Accordingly, an improved method is required so that a profile for a terminal having an internal security module can be provisioned without synchronization with an external network and profiles for a large number of terminals can be encrypted and stored in advance.

DISCLOSURE OF INVENTION

Technical Problem

In order to solve the above problems, the present disclosure provides a method and a device for provisioning a profile without synchronization with an external network when providing the profile to a terminal.

Further, the present disclosure provides a method and a device for storing a large number of profiles and password keys for encrypting the profiles in advance of provisioning profiles and providing encrypted profile information to terminals when provisioning profiles of the terminals.

Solution to Problem

In order to achieve the above object, a method for installing a profile of an eUICC (embedded Universal Integrated Circuit Card) of a network device according to the present disclosure may include the steps of: acquiring at least one profile encrypted with a first password key and at least one first password key encrypted with a second password key; and transmitting the at least one encrypted profile and the at least one encrypted first password key to at least one eUICC when profile installation for the eUICC starts. The first password key is re-encrypted by the first password key with a third password key and transmitted to the at least one eUICC and the encrypted profiles are decrypted by the first password key and installed in the at least one eUICC respectively.

Each of the first password key, second password key, and third password key may be configured respectively with a plurality of keys. For example, the first password key, second password key, and third password key may be a password key set including key information. Further, each password key may be an SCP 80 key, SCP 81 key, SCP 03, or asymmetric key. As examples of the asymmetric key in RSA based authentication, there are a public key included in an authentication certificate in a plain language and a personal key generated in pair with the public key and safely stored in an entity owned by the authentication certificate. In the following description, encrypting by using an authentication certificate means transmitting contents by encrypting with a public key included in a receiving entity of the authentication certificate, and the receiving entity can perform decryption by using the personal key stored internally.

Further, a method for installing a profile of an eUICC (embedded Universal Integrated Circuit Card) of an SM-DP (Subscription Manager Data Preparation) according to the present disclosure may include the step of transmitting at least one of at least one encrypted profile and at least one first password key for encrypting the at least one profile to a network device. The at least one encrypted profile and the at least one first password key are transmitted to at least one eUICC if profile installation for the eUICC starts, and the at least one first password key is transmitted to the at least one eUICC by encrypting with a third password key and the at least one encrypted profile is transmitted to the at least one eUICC by decrypting with the at least one first password key.

Further, a network device for installing a profile of an eUICC (embedded Universal Integrated Circuit Card) according to the present disclosure may include: a communication unit configured to perform data communication; an encryption device configured to perform encryption and decryption; and a storage device configured to acquire at least one encrypted profile and at least one first password for encrypting the at least one profile. The communication unit transmits the at least one encrypted profile and the at least one first password key to at least one eUICC when profile installation for the eUICC starts, the encryption device transmits the at least one first password key to the at least one eUICC by encrypting with a third password key, and the at least one encrypted profile is installed in the at least one eUICC by decrypting with the at least one first password key.

Further, an SM-DP (Subscription Manager Data Preparation) server for installing a profile of an eUICC (embedded Universal Integrated Circuit Card) according to the present disclosure may include: a communication unit configured to perform data communication; and a control unit configured to control to transmit at least one of at least one encrypted profile and at least one first password key for encrypting the at least one profile to a network device. The at least one encrypted profile and the at least one first password key are transmitted to at least one eUICC when a profile installation starts for the eUICC, and the at least one first password key is transmitted to the at least one eUICC by encrypting with a third password key, and the at least one encrypted profile is installed in the at least one eUICC by decrypting with the at least one first password key.

Advantageous Effects of Invention

According to various embodiments of the present invention, an encrypted profile can be provided without a performance or data loss when provisioning profiles at the same time for a large number of terminals having an internal security module.

Further, according to various embodiments of the present invention, profile provisioning can be performed for a large number of terminals even though an external network state of connecting a profile providing server and the terminals is poor.

MODE FOR THE INVENTION

Figure 1:
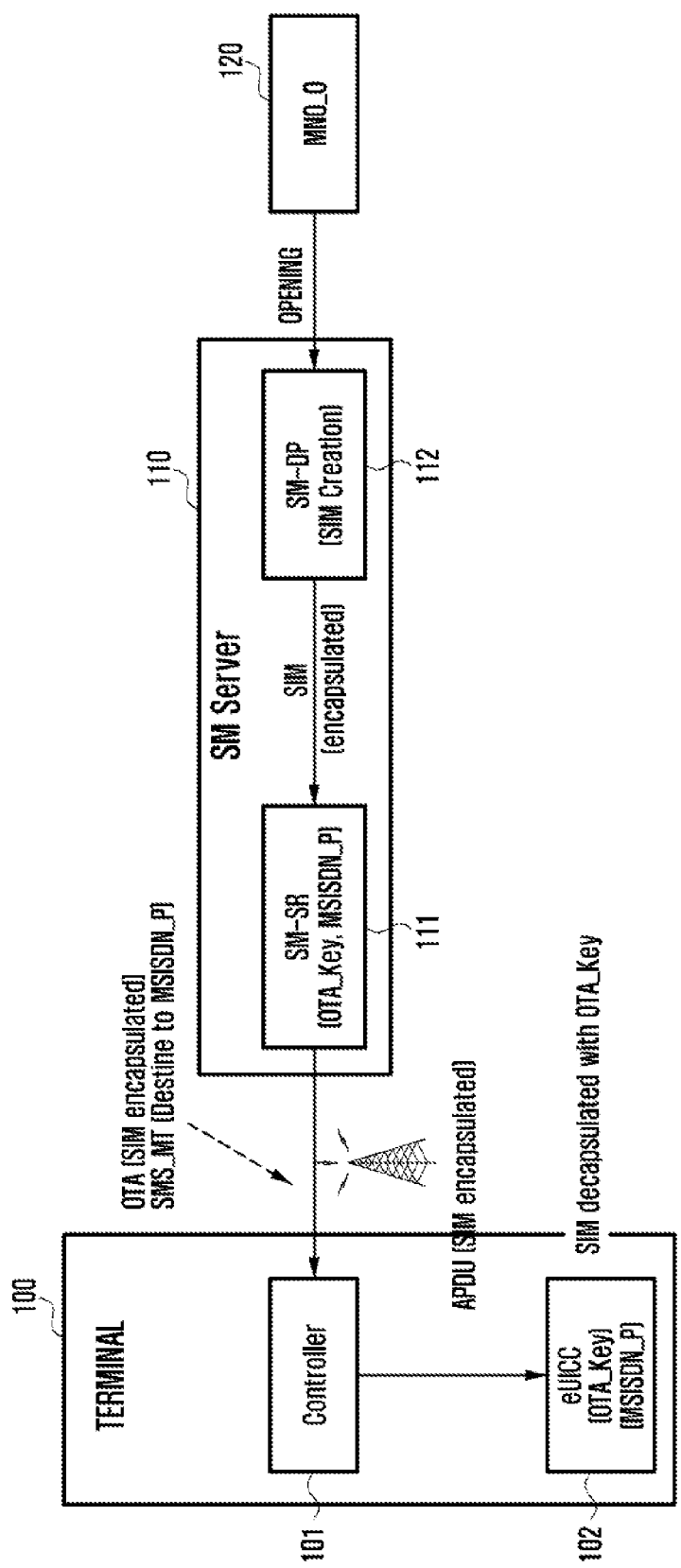
FIG. 1 illustrate a structure of a network supporting an eUICC.

The present disclosure relates to a terminal equipped with an internal security module and can be applied to general electronic terminals such as a smartphone, portable terminal, mobile terminal, PDA (Personal Digital Assistant), PMP (Portable Multimedia Player) terminal, notebook computer, Wibro terminal, smart TV, and smart refrigerator, and further applied to all the devices or services supporting an internal security module.

The present disclosure provides an internal security module, profile providing server, and network device supporting a profile installation for the internal security module.

The internal security module is called eSE (embedded Secure Element), and a typical example may be an eUICC. The following embodiments are disclosed mainly for the eUICC, however it will be clear to those skilled in the art that the present disclosure can be applied to various type of internal security module including the eUICC. In the present disclosure, the term "eUICC" can be used interchangeably with an eSIM (embedded Subscriber Identity Module). The eUICC according to various embodiments of the present disclosure can be installed in a terminal or added to the terminal in a detachable type.

A profile installed in an internal security module includes data information such as one or more applications, subscriber authentication information, telephone book stored in a UICC. The profile may include an operational profile and a provisioning profile (or bootstrap profile) according to use. The operational profile is packaged in a software form, and may mean subscriber information of a terminal serviced by a mobile communication company. The provisioning profile is required for connecting to a certain mobile communication network in a country before a user subscribes to a certain communication company, and may mean a profile launched in an eUICC in advance. The provisioning profile may be used only for providing a network connection environment to download an operational profile remotely and may include information required for connecting to a certain mobile communication network such as an IMSI and a K value.

A profile providing server is called SM-DP (Subscription Manager Data Preparation), and may be used as meanings of off-card entity of profile domain, profile encrypting server, profile generating server, profile provisioner, or profile provider.

A network device supporting installation of a profile in an internal security module may be configured in a server form by including at least one of an encryption device for encrypting or decrypting a profile and a storage device for storing at least one profile. In case that the network device is configured with only one of the encryption device and the storage device, the network device may be an encryption device or a storage device itself. Alternatively, in case that the network device configured with both of the encryption device and storage device, the network device may operate as a device including an encryption device and a storage device or may be interpreted as a common meaning of including an encryption device and a storage device separately.

The encryption device may include a HSM (Hardware Security Module) or may be called HSM itself.

Further, various terms can be defined and used for a network supporting an eUICC.

For example, as a term used in the present disclosure, SM-SR (Subscription Manager Secure Routing) may be expressed as a profile managing server which takes the role of transmitting an encrypted profile to an eUICC by using an OTA. Further, the SM-SR may be expressed as an off-card entity of eUICC profile manager or a profile manager.

Further, as a term used in the present disclosure, EID (eUICC identifier) is a unique identifier for distinguishing eUICCs installed in a terminal, and may mean a profile ID if a provisioning profile is pre-installed in the eUICC, or may mean a terminal ID if the terminal and the eUICC (or eSIM) chip are not separated. Further, E-UICC ID may indicate a specific secure domain of an eSIM chip.

Further, as a term used in the present disclosure, EIS (eUICC Information Set) may include an EID and an ICCID as eUICC information stored in the SM-SR.

Further, as a term used in the present disclosure, EF (Elementary File) may mean a file storing information in a profile of an eUICC which can store an IMSI and a MSISDN.

Further, as a term used in the present disclosure, MNO (Mobile Network Operator) may mean a mobile communication provider or a system of the mobile communication provider.

Further, as a term used in the present disclosure, HSM (Hardware Security Module) may mean a module for encrypting or decrypting a password key in order not to expose the password key.

Specific terms used hereinafter are provided to help understanding of the present disclosure and may be modified to various forms without departing from the technical scope of the present invention.

The terms and words used in the following description and claims are not limited to bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the" include plural referents unless the context clearly dictates otherwise. It should be understood that the terms such as "configure" and "include" do not always include all the components or steps described in the present disclosure.

Hereinafter, embodiments of the disclosure are described in detail with reference to the accompanying drawings. The same reference symbols are used throughout the drawings to refer to the same or like parts. Detailed descriptions of well-known functions and structures incorporated herein may be omitted to avoid obscuring the subject matter of the disclosure. Further, the terms described hereafter are defined by considering functions in the present disclosure and may be changed according to intention or practice of a user or an operator. Therefore, the terms should be defined on the basis of general contents of the present disclosure.

FIG. 1 illustrate a structure of a network supporting an eUICC.

With reference to FIG. 1, the network supporting an eUICC may be configured with a terminal 100, SM server 110, and MNO 120. The SM server 110 may be configured with an SM-SR 111 and an SM-DP 112.

The terminal 100 includes an eUICC 102 installed as an internal security module. The eUICC may have an EID as a unique identifier, and the EID can be indicated as a physical or software element in the terminal 100.

The terminal 100 performs data communication by connecting to a mobile communication network corresponding to at least one profile stored in the eUICC 102 under the control of the control unit 101. In particular, a provisioning profile used for connecting to a network temporarily can be stored in the eUICC 102 so that the terminal 100 can download and install a profile to be used.

The terminal 100 can perform profile installation by triggering a profile installation event. In more detail, the terminal 100 transmits a request for a profile including an EID to the SM-SR 111, and receives a profile encrypted with a session key pre-shared with the SM-DP 112 through an authentication process of the SM-SR 111. The terminal 100 connects to the mobile communication network by decrypting the profile with the session key.

In various embodiments, the terminal 100 can share a session key with the SM-DP 112 by using a digital authentication method. For example, the terminal 100 can receive a digital authentication certificate corresponding to its own eUICC 112 from the SM-DP 112 through the SM-SR 111, generate a session key by using the received digital authentication certificate, and transmit to the SM-DP 112 by encrypting the session key. The SM-DP 112 can decrypt the received session key by using the digital authentication certificate and transmit a profile for the eUICC 102 corresponding to the digital authentication certificate to the terminal 100 by encrypting with the session key. In case of using the digital authentication method, the SM-DP 112 can encrypt a profile by using a public key generated with the digital authentication certificate, and the terminal 100 can decrypt the profile by using a secret key (private key) generated with the digital authentication certificate. The method of using a digital authentication certificate has been described above as an example of sharing a session key, however the present disclosure is not limited to this and may use various method of sharing an authentication algorithms between the SM-DP 112 and the terminal 100.

The SM-SR 111 manages profile information for a plurality of terminals. The SM-SR 111 can transmit an SMS for downloading a profile to an MSISDN of the eUICC 102 by triggering a profile installation event. In various embodiments, the SM-SR 111 can perform a function of transmitting an encrypted session key or an encrypted profile between the SM-DP 112 and the terminal 100. The SM-SR 111 can exchange data with the terminal 100 by using a verified OTA technology. Namely, the SM-SR 111 can transmit data to the terminal by using an OTA Key. The SM-SR 111 can perform profile management functions of activating, deactivating, and removing a profile after completing decryption and installation of the profile in the eUICC 102.

The SM-DP 112 generates a profile for the eUICC 102 installed in the terminal 100 and encrypts the profile by using a session key. If a request for installing a profile is received from a certain eUICC 102, the SM-DP 112 can transmit the profile by encrypting with a session key pre-shared with the corresponding eUICC 102. Alternatively, if a verified session key is received from the terminal 100, the SM-DP 112 transmits a profile encrypted with the corresponding session key to the terminal 100. The SM-DP 112 can operate directly by an MNO 120 or by other companies having a perfect trust relationship with the MNO 120. According to a business or contract relationship, the SM-DP 112 can provide a service for one or more MNOs 120.

At least one MNO 120 may exist in a network. The MNO 120 provides a communication service for the terminal 100. The MNO 120 can manage the SM-DP 112 and help a profile installation of the terminal by using the SM-DP 112 if a user of the terminal 100 applies for a subscription to a service. At least one MNO 120 can manage separate SM-DPs 112 individually. Alternatively, an SM-DP 112 can provide a service for a plurality of MNOs 120 according to a trusted contract relationship.

Hereinafter, a method for installing a profile will be described for the eUICC in the network illustrated by FIG. 1.

Figure 2:
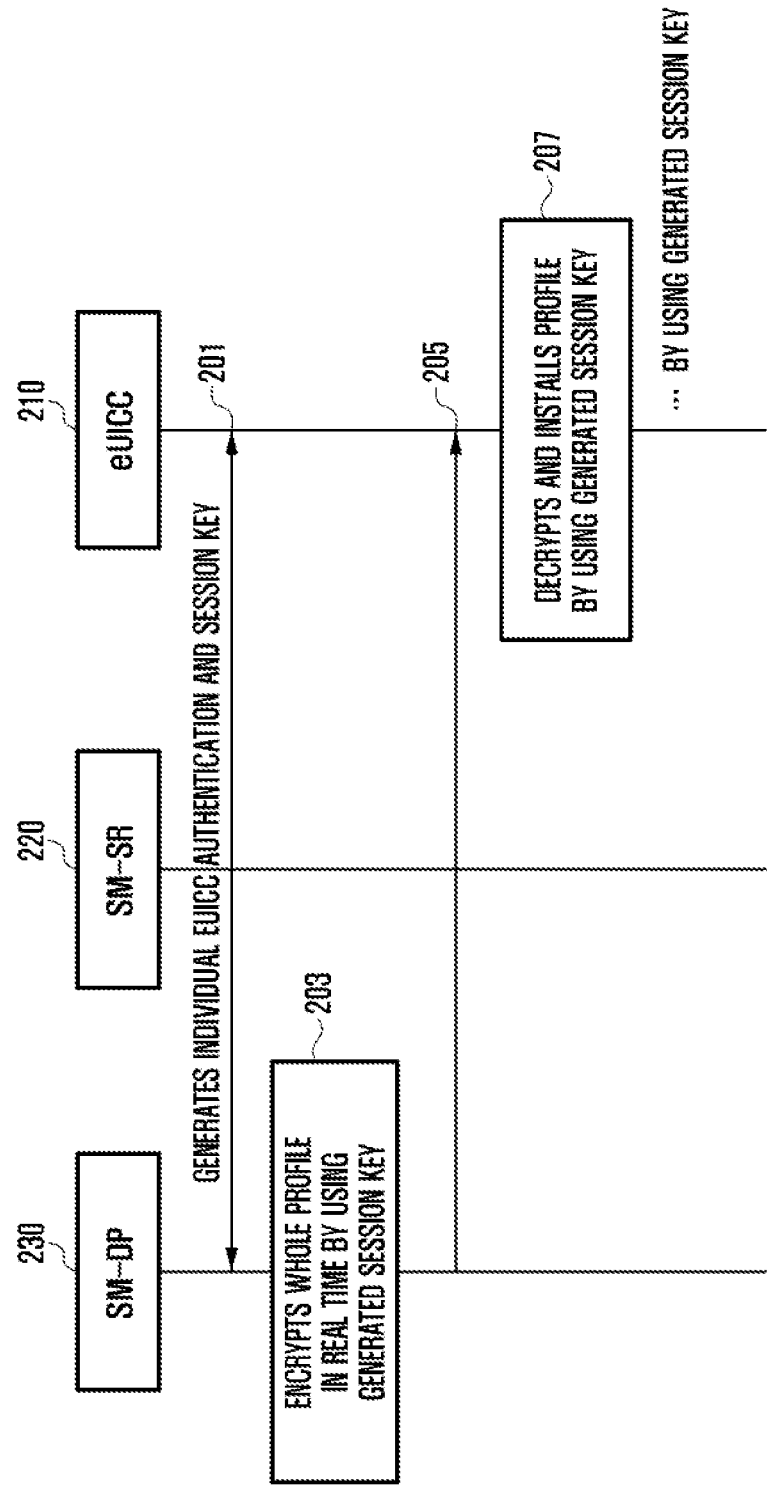
FIG. 2 is a flowchart illustrating a method for installing a profile of an eUICC.

FIG. 2 is a flowchart illustrating a method for installing a profile of an eUICC. Although a data flow of the SM-SR 220 2 between the SM-DP 230 and the eUICC 210 is not shown in FIG. 2, the SM-SR 220 can transmit the whole or partial information for configuring a profile and a session key encrypted by the SM-DP 230 to the eUICC 210, or transmit the whole or partial information for configuring a session key encrypted by the eUICC 210 to the SM-DP 230.

With reference to FIG. 2, the eUICC 210 and the SM-DP 230 generate individual eUICC authentication and session keys at step 201.

In more detail, the SM-DP 230 generates session keys through authentication for each eUICC 210 distinguished by an EID and generates a profile by using the generated session key. The eUICC 210 can obtain a session key through an authentication process in real time and decrypt the encrypted profile transmitted from the SM-DP 230 by using the obtained session key.

The SM-DP 230 encrypts profiles for each eUICC 210 individually with corresponding session keys at step 203, and transmits the profiles to the eUICCs 210 at step 205. The eUICC 210 decrypts and installs the profile by using the session key generated in the real time through the authentication process. Because each session key corresponds to each eUICC 210 one by one, a profile encrypted by a specific session key can be decrypted only by a specific eUICC 210 corresponding to the session key.

The above process is performed for each eUICC individually when the eUICC 210 starts a profile installation actually. The SM-DP 230 may be equipped with a separate encryption module for encrypting a profile, however the SM-DP 230 cannot perform the profile installation correctly if a great number of eUICCs requests for the profile installation at the same time because it takes time for the encryption module to encrypt a profile. Further, if the profile installation stops because of a network disconnection while performing the profile installation individually, the profile cannot be correctly installed for all the eUICCs 210.

Accordingly, an efficient method for installing a profile can be used by storing pre-encrypted profiles in the SM-DP 230 for a great number of terminals in advance of installing a profile in the eUICC 210 and transmitting the pre-encrypted profile to the terminals when a profile installation starts actually. Further, a method for downloading a profile independently from the SM-DP 230 located in an external network is required when installing the profile in the eUICC 210.

Hereinafter, a method for installing a profile which can provide the above technical characteristics will be described according to the present invention.

Figure 3:
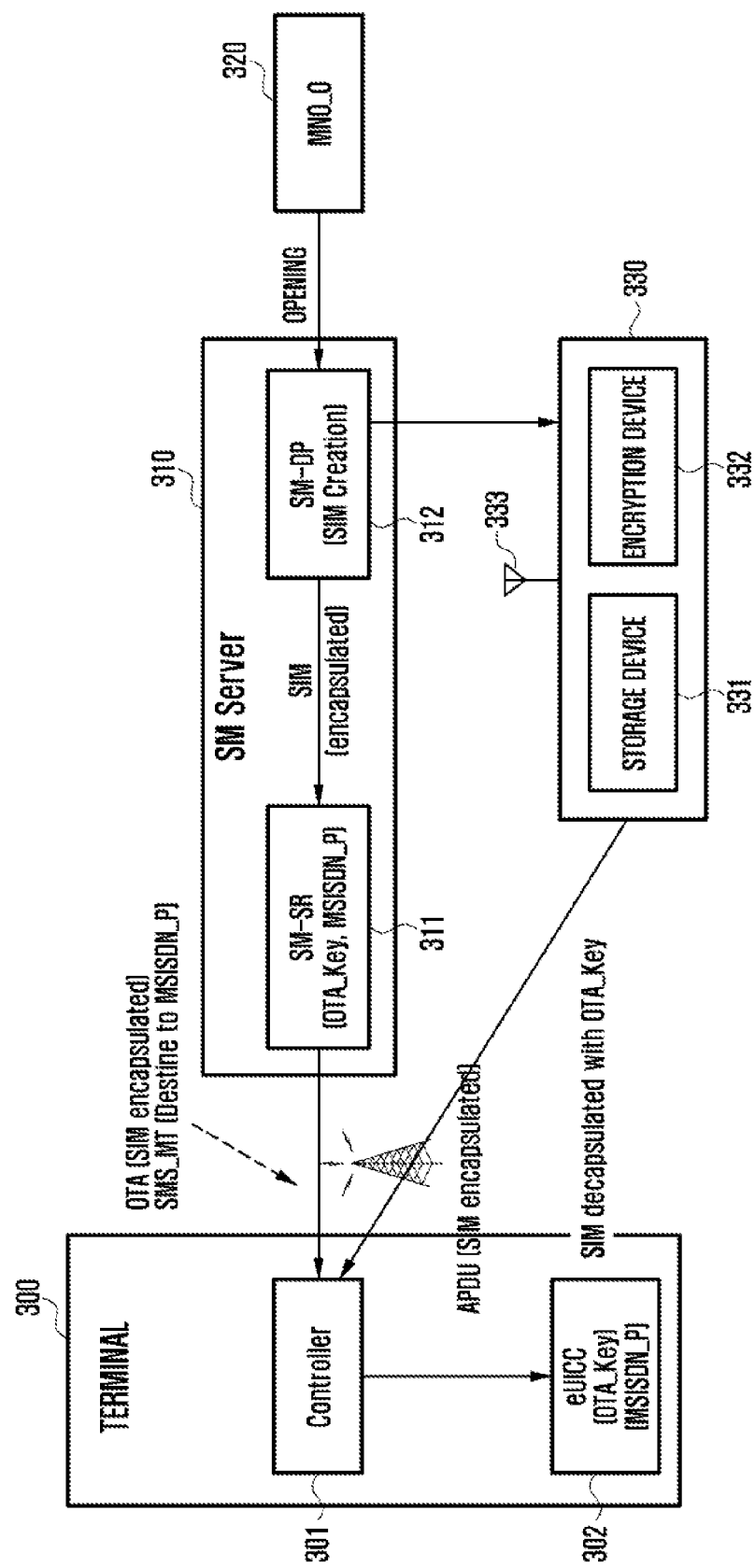
FIG. 3 illustrates a structure of a network supporting an eUICC according to the present invention.

FIG. 3 illustrates a structure of a network supporting an eUICC according to the present invention.

With reference to FIG. 3, the network supporting an eUICC according to the present disclosure may be configured with a network device 330 supporting a profile installation of an eUICC.

The network device 330 may be configured with at least one of an encryption device 331 for encrypting or decrypting a profile and a storage device 332 for storing at least one profile.

The encryption device 331 may include a HSM or may be called HSM itself, and can perform encryption and decryption of a profile without exposing a password key.

The storage device 332 stores at least one profile. The storage device 332 may include at least one medium of a hard disk, RAM (Random Access Memory), SRAM (Static Random Access Memory), ROM (Read-Only Memory), EEPROM (Electrically Erasable Programmable Read-Only Memory), PROM (Programmable Read-Only Memory), magnetic memory, magnetic disk, and optical disk.

In case that the network device 330 includes one of the encryption device 331 and the storage device 332, the network device 330 may be the encryption device 331 or the storage device 332 itself. Alternatively, in case that the network device 330 include both of the encryption device 331 and the storage device 332, the network device 330 may operate as a device including the encryption device 331 and the storage device 332, or can be interpreted as a common concept of including the encryption device 331 and the storage device 332 configured separately.

Further, the network device 330 can be configured with a communication unit 333. The communication unit 333 transmits and receives data. When the network device 330 operates as a device including the encryption device 331 and the storage device 332, the communication unit 333 can be equipped in the network device 330. On the other hand, when the network device 330 is interpreted as a common concept of including the encryption device 331 and the storage device 332 configured separately, the communication unit 333 can be installed in each of the encryption device 331 and the storage device 332. In this case, the encryption device 331 and the storage device 332 can exchange data through the communication unit 333.

The network device 330 can be configured in a server form. When the network device 330 operates as a device including the encryption device 331 and the storage device 332, the network device 330 may include a separate control device for controlling the encryption device 331 and the storage device 332 centrally.

Example of entities included in a network supporting an eUICC according to the present disclosure have been described above, however various entities required for providing and installing a profile for an eUICC may be further included, and devices having the same or similar functions can be configured by omitting or integrating some of them. In this case, the entities configuring a network can be modified according to the technical scope of the present invention, and if the entities configuring the network operate within the technical scope of the present invention, it will be clear to those skilled in the art that corresponding embodiments still fall within the scope of rights defined by the appended claims.

Hereinafter, the method for installing a profile for an eUICC practically in a network according to the above embodiments of the present disclosure will be described in more detail.

Figure 4:
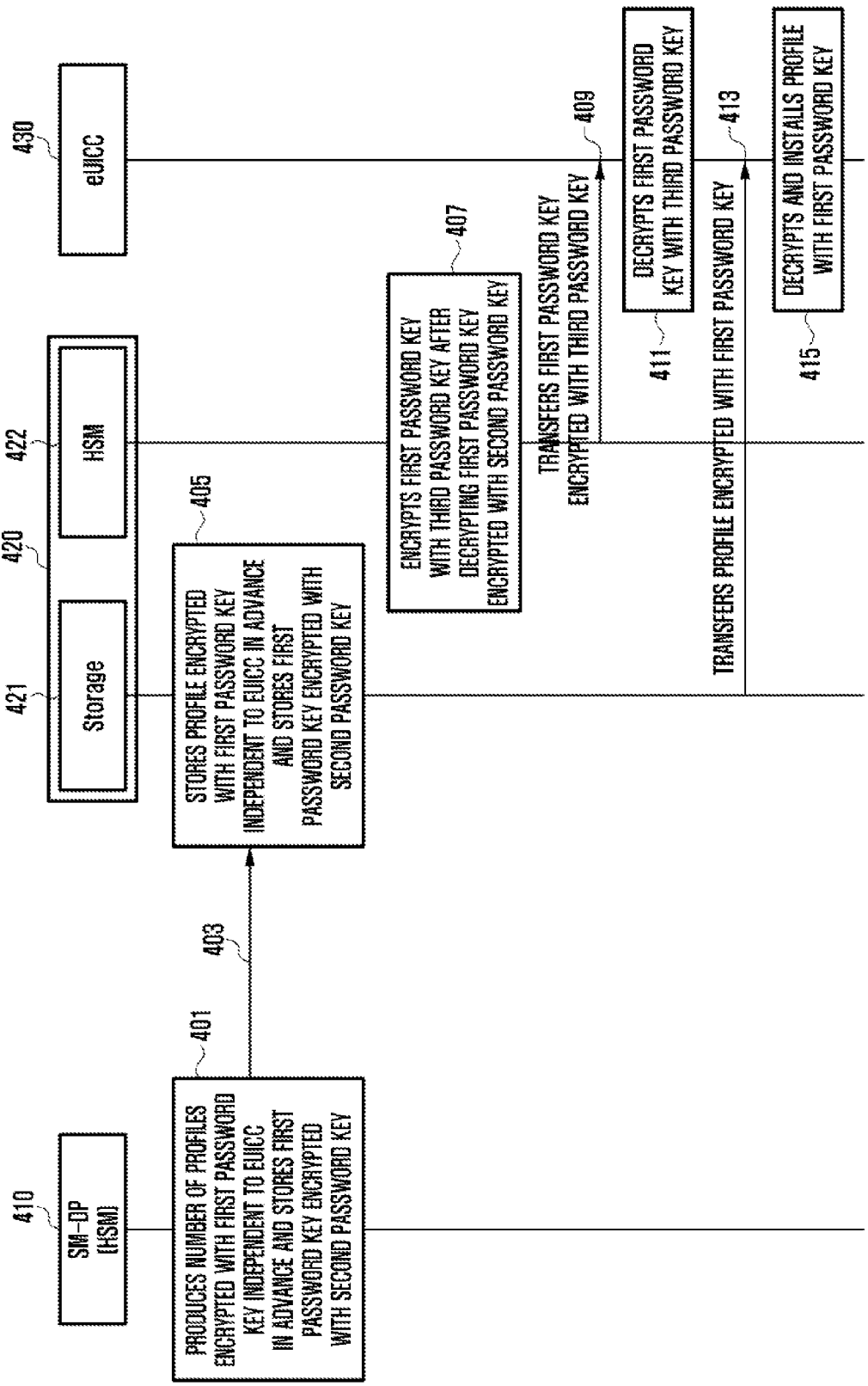
FIG. 4 is a flow chart illustrating a method for installing a profile of an eUICC according to a first embodiment of the present invention.

FIG. 4 is a flow chart illustrating a method for installing a profile of an eUICC according to a first embodiment of the present invention.

With reference to FIG. 4, in the first embodiment of the present invention, the SM-DP 410 generates a profile encrypted with a first password key and the first password key encrypted with a second password key in a pair at step 401.

The SM-DP 410 generates profiles for a plurality of eUICCs 430. The SM-DP 410 can generate an IMSI and a K value of a secrete key as information for configuring the profiles of each eUICC 430.

The SM-DP 410 encrypts each profile with a first password key corresponding to each profile. The first password key is a random key generated by a HSM installed in the SM-DP 410, and may be a symmetric key, asymmetric key, or SCP 03 session key. The first password key is independent to the eUICC 430 (i.e., not mapped onto an EID), and corresponds to each profile one by one. Accordingly, a profile encrypted with the first password key is not for a specific eUICC 430, and may be generated in a bulk form. The SM-DP 410 can generate and store a large number of profiles encrypted with the first password key in a bulk form.

The SM-DP 410 encrypts and stores the first password key with a second password key. The second password key may be a symmetric key or an asymmetric key as a master key. Further, the second password key may be used for mutual authentication between the SM-DP 410 and a network device by using a pre-shared key.

The SM-DP 410 transmits the profile encrypted with the first password key and the first password key encrypted with the second password in a pair to the storage device 421 at step 403. The storage device 421 stores the profile encrypted with the first password key and the first password key encrypted with the second password in a pair at step 405 before starting a profile installation.

If the profile installation of the eUICC 430 starts actually at a certain time, an encryption device 422 decrypts the first password key encrypted with the second password key and encrypts the first password key again with a third password key at step 407.

The third password key is an electronic key issued by individual eUICCs 430, and may be a symmetric key or an asymmetric key. The third password key is generated by a digital authentication method, and may be configured with a public key and a secret key generated in a pair according to a pre-shared authentication method. The third password key corresponds to an eUICC 430 one by one, and a corresponding third password key can be decrypted only by a specific eUICC 430.

The encryption device 422 and the eUICC 430 can share the third password key in an offline sharing method or a network communication method before or after starting a profile installation. In an embodiment, the encryption device 422 and the eUICC 430 can share the third password key in a method of sharing a digital authentication certificate. Namely, the encryption device 422 and the eUICC 430 have the same digital authentication certificate, and thereby can perform mutual authentication (data encryption and decryption) by using a public key and a secret key generated in a pair from a corresponding digital authentication certificate.

The encryption device 422 transmits the first password key encrypted with the third password key to the eUICC 430 at step 409. The eUICC 430 stores the first password key by decrypting with the pre-shared third password key at step 411.

Subsequently, the eUICC 430 receives a profile encrypted with a second password key from the storage device 421 at step 413.

In various embodiments, the network device 420 can transmit the whole or partial information required for configuring an encrypted profile and a first password key to the eUICC 430.

The eUICC 430 installs a corresponding profile after decrypting the profile encrypted with the first password key at step 415.

According to the first embodiment, the SM-DP 410 can generate a large number of encrypted profiles before installing a profile of an eUICC 430 without a time limitation. Further, the SM-DP 410 encrypts a profile and a first password key used for encryption of the profile with a password key pre-shared with the network device 420, and stores them in the network device 420 in advance. Therefore, a profile can be transmitted to the eUICC 430 without a direct synchronization with the SM-DP 410 when installing the profile.

Figure 5:
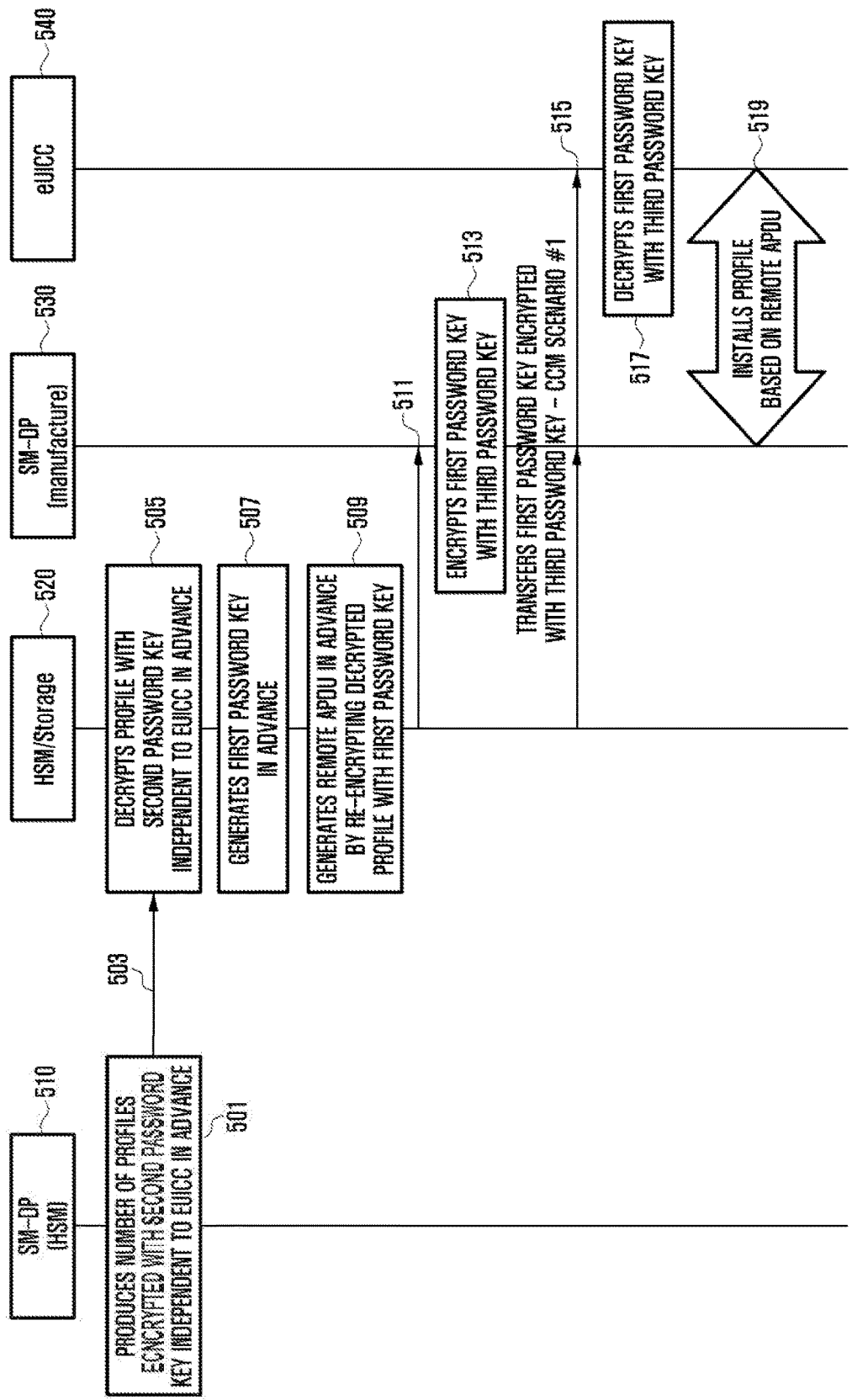
FIG. 5 is a flowchart illustrating a method for installing a profile of an eUICC according to a second embodiment of the present invention.

FIG. 5 is a flowchart illustrating a method for installing a profile of an eUICC according to a second embodiment of the present invention.

With reference to FIG. 5, in the second embodiment of the present invention, an SM-DP 510 generates a profile encrypted with a second password key at step 501. Here, the SM-DP 510 may be a profile providing server of an SIM manufacturer.

The SM-DP 510 generates profiles for a plurality of eUICCs 540. The SM-DP 510 can generate an IMSI and a K value of a secret key as information for configuring profiles of each eUICC 540.

The SM-DP 510 encrypts each profile with the second password key. The second password key is a master key which may be a symmetric key or an asymmetric key. Further, the second password key may be pre-shared between the SM-DP 510 and the network device 520. The second password key is independent to the eUICC 540, and may correspond to each profile one by one, or may be identical for all the profiles. The profile encrypted with the second password key can be generated randomly without fixing to a specific eUICC 540.

The SM-DP 510 transmits the profile encrypted with the second password key to a network device 520 at step 503. The network device 520 decrypts the profile encrypted with the second password key at step 505.

Subsequently, the network device 520 generates a first password key directly at step 507. The first password key is generated randomly by an encryption device installed in the network device 520, and may be a symmetric key, asymmetric key, or SCP 03 session key.

The network device 520 generates a profile encrypted with the first password key by re-encrypting the profile with the first password key at step 509.

In an embodiment, the network device 520 can generate a profile encrypted in a remote APDU (Application Protocol Data Unit) form. The remote APDU is a kind of standard (ETSI TS 102.226) for transmitting an encrypted command between a remote server and an eUICC, and generated when transmitting data by splitting with an array buffer unit. The network device 520 can generate the remote APDU by re-encrypting a profile with the first password key.

The network device 520 transmits the first password key and the profile encrypted with the first password key to an SM-DP 530 at step 511. Here, the SM-DP 530 may be a profile providing server of an SIM or a profile providing server operating separately by a terminal manufacturer. The SM-DP 530 can store a large number of first password keys and profiles encrypted with the first password keys before starting a profile installation.

If a profile installation of an eUICC 540 starts actually at a certain time, the SM-DP 530 encrypts the first password key with a third password key at step 513. The third password key is an electronic key issued by the eUICC 540 and may be a symmetric key or an asymmetric key. The third password key is provided by a digital authentication method, and a public key and a secret key may be generated in a pair according to a pre-shared authentication method. The third password key corresponds to each eUICC 540 one by one, and thereby can be decrypted only by a specific eUICC corresponding to the third password key.

The SM-DP 530 and the eUICC 540 can share the third password key in an offline sharing method or a network communication method before or after starting a profile installation. In an embodiment, the SM-DP 530 and the eUICC 540 can pre-share the third password key in a method of sharing a digital authentication certificate. Namely, the SM-DP 530 and the eUICC 540 have the same digital authentication certificate, and thereby can perform mutual authentication (data encryption and decryption) by using a public key and a secret key generated in a pair from the corresponding digital authentication certificate.

The SM-DP 530 transmits the first password key encrypted with the third password key to the eUICC 540 at step 515. In an embodiment, the SM-DP 530 can transmit the first password key to the eUICC 540 according to a CCCM Scenario #1. The Scenario #1 is one of global platform specification technologies of encrypting and transmitting a session key, and can be performed by transmitting a first password key through a direct communication between the SM-DP 530 and the eUICC 540 corresponding to a request for a first password key (or transmission of a first password key) and responding to the first password key.

The eUICC 540 stores the first password key by decrypting the first password key with a pre-shared third password key at step 517.

Subsequently, the eUICC 540 performs a profile installation based on a remote APDU of the SM-DP 530 at step 519. The eUICC 540 receives a remote APDU generated by encrypting with a first password key from the SM-DP 530, and obtains a profile by decrypting the remote APDU with the first password key. Accordingly, the eUICC 540 can install the obtained profile.

According to the second embodiment, the SM-DP 510 can pre-store a large number of encrypted profiles generated by a network device in advance of starting a profile installation of an eUICC 540 without a time limitation. Further, the SM-DP 510 enables a profile installation with less influence on a network state by provisioning an encrypted profile and a first password key used for the encryption based on the remote APDU.

In comparison with the first embodiment, the second embodiment can be distinguished from the first embodiment in a fact that the main body of generating a first password key and decrypting a profile with the first password key is changed from an SM-DP to a network device. Further, the second embodiment can be distinguished from the first embodiment in a fact that the main body of transmitting an encrypted profile is changed from a network device to an SM-DP. Accordingly, the second embodiment has a difference from the first embodiment in a fact that a CCCM Scenario #1 is used when transmitting a first password key encrypted with a third password key and a profile installation is performed based on a remote APDU.

Figure 6:
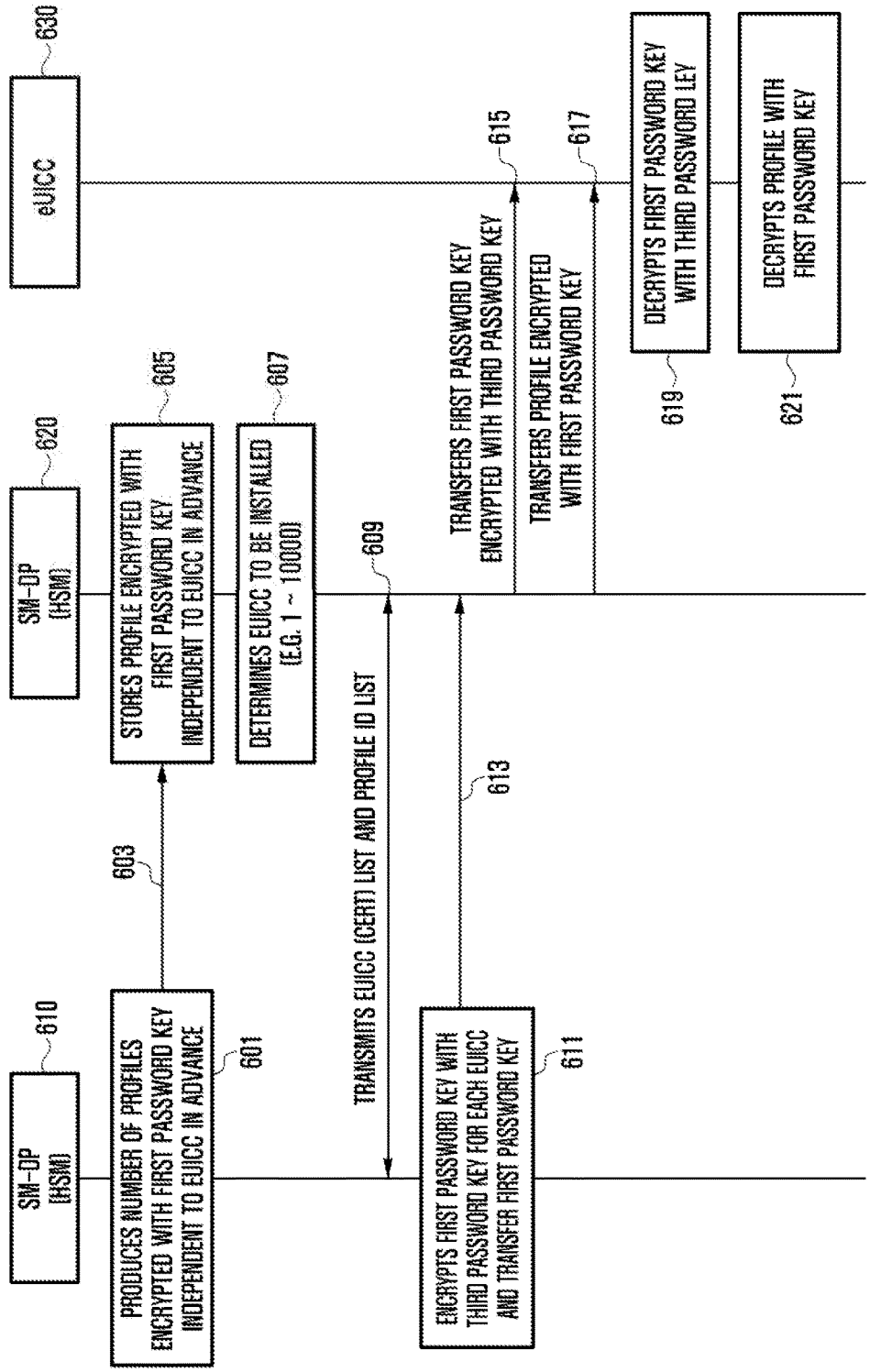
FIG. 6 is a flowchart illustrating a method for installing a profile of an eUICC according to a third embodiment of the present invention.

FIG. 6 is a flowchart illustrating a method for installing a profile of an eUICC according to a third embodiment of the present invention.

With reference to FIG. 6, in the third embodiment of the present invention, the SM-DP 610 generates a profile encrypted with a first password key at step 601.

The SM-DP 610 generates profiles for a plurality of eUICCs 630. The SM-DP 610 can generate an IMSI and a K value of a secrete key of each eUICC 630 as information for configuring the profiles of each eUICC 630.

The SM-DP 610 encrypts each profile with a first password keys corresponding to each profile. The first password key is generated randomly by a HSM installed in the SM-DP 610, and may be a symmetric key, asymmetric key, or SCP 03 session key. The first password key is independent to the eUICC 630 and corresponds to each profile one by one. Accordingly, a profile encrypted with the first password key is not for a specific eUICC 650 and generated in a bulk form. The SM-DP 610 can generate and store a large number of profiles encrypted with the first password key in a bulk form.

The SM-DP 610 transmits the profile encrypted with the password to a network device 620 at step 603. The network device 620 stores the profile encrypted with the first password at step 605 in advance of starting a profile installation.

If a profile installation of an eUICC 630 starts actually at a certain time, the network device 620 determines at least one eUICC to be installed with a profile at step 607. The network device 620 can identify an eUICC 640 triggered by a profile installation event according to a predetermined condition or a request from the eUICC 630 or an MNO, and determine at least one eUICC to be installed with a profile based on the identification result.

The network device 620 transmits information (list) related to at least one eUICC to be installed with a profile to the SM-DP 610 at step 609. The information related to at least one eUICC to be installed with a profile may include an identifier (EID) of a corresponding eUICC, identifier of a profile to be installed in the corresponding eUICC, and authentication certificate of the corresponding eUICC.

If the information related to at least one eUICC is received from the eUICC, the SM-DP 610 encrypts the first password key with a third password key at step 611. The third password key is an electronic key issued by an eUICC 630, and may be a symmetric key or an asymmetric key. The third password key provided in a digital authentication method, and can be configured with a public key and a secret key generated in a pair according to a pre-shared authentication method. The third password key corresponds to an eUICC 630 one by one, and thereby can be used for decryption only in a specific eUICC corresponding to a third password key.

The SM-DP 610 and the eUICC 630 can share the third password key in an offline sharing method or a network communication method before or after starting a profile installation. In an embodiment, the SM-DP 610 and the eUICC 630 can pre-share the third password key in a method of sharing a digital authentication certificate. Namely, the SM-DP 610 and the eUICC 630 have the same digital authentication certificate, and thereby can perform mutual authentication (data encryption and decryption) by using a public key and a secret key generated in a pair from the corresponding digital authentication certificate. In various embodiments, the first password key encrypted with the third password key can be transmitted from the SM-DP 610 to the eUICC 630 directly.

The SM-DP 610 transmits the first password key encrypted with the third password key to the network device 620 at step 613. The network device 620 transmits an encrypted second password key to the eUICC 630 at step 615. Further, the network device 620 transmits a profile encrypted with the first password key to the eUICC 630 at step 617.

The eUICC 630 obtains the first password key by decrypting the first password key encrypted with the third password key at step 619, and installs a corresponding profile after decrypting the profile with the obtained first password key at step 621.

According to the third embodiment, the network device 620 can pre-store a large amount of encrypted profiles generated by the SM-DP 610 without a time limitation in advance of starting a profile installation of the eUICC 630.

In comparison with the first embodiment, the third embodiment is distinguished from the first embodiment in a fact that transmission of an encrypted first password key is performed only for an eUICC requested by the network device after starting a profile installation.

Hereinafter, a configuration of a device operating according to the embodiments of the present disclosure will be described.

Figure 7:
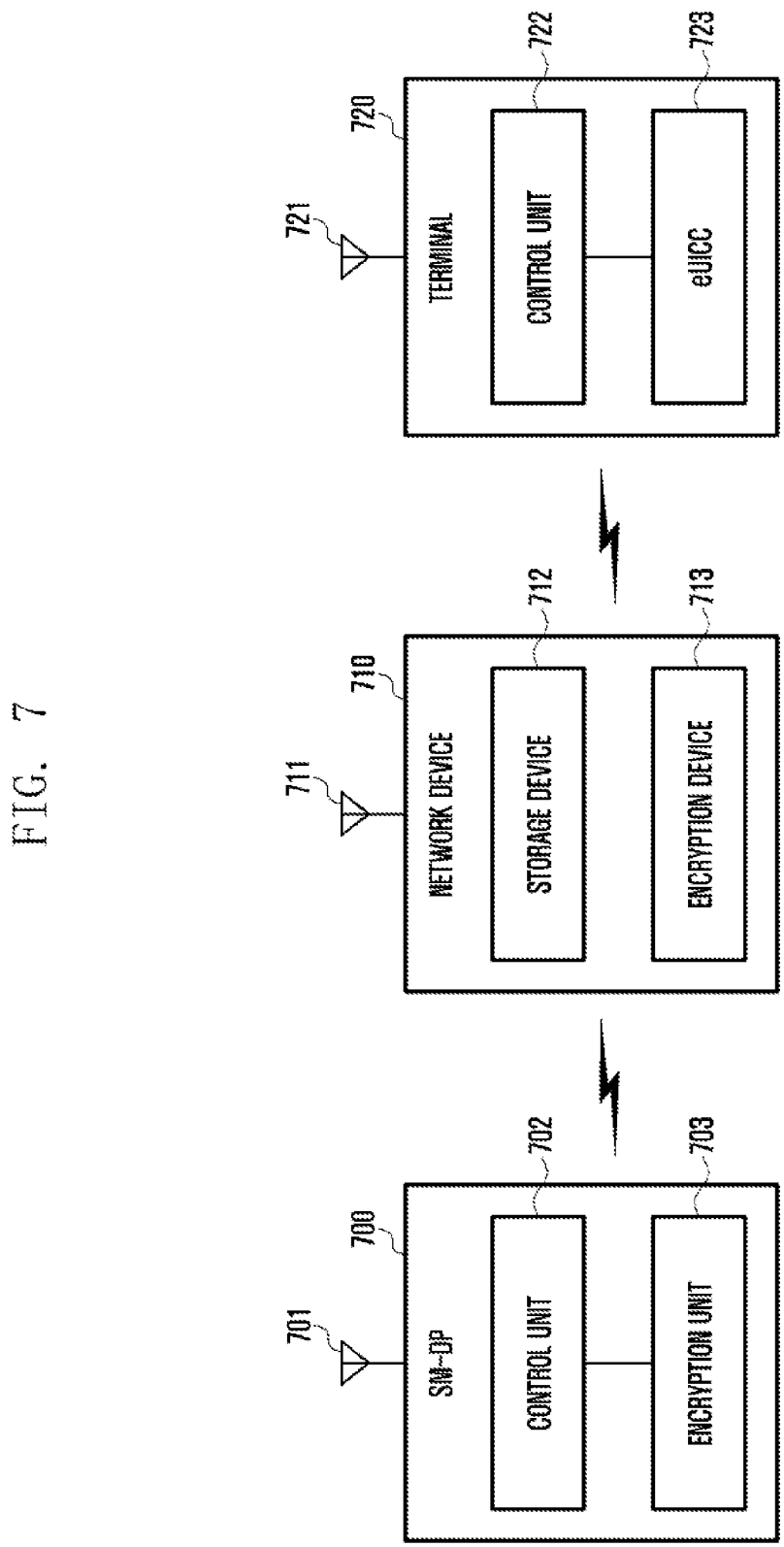
FIG. 7 is a block diagram illustrating structures of devices according to embodiments of the present invention.

FIG. 7 is a block diagram illustrating structures of devices according to embodiments of the present invention.

With reference to FIG. 7, an SM-DP 700 according to an embodiment of the present disclosure may be configured with a communication unit 701, control unit 702, and encryption unit 703.

The communication unit 701 can transmit and receive data to/from other devices. The communication unit 701 can transmit and receive an encrypted key and an encrypted profile. For this, the communication unit 701 may include at least one communication module and antenna.

The control unit 702 can control each component of the SM-DP 700 to install a profile according to the present invention. The detailed operations of the control unit 702 are same as the above description.

The encryption unit 703 performs encryption or decryption of a key or a profile according to the control of the control unit 702. The encryption unit 703 may be installed in the control unit 702 or provided in a software code form driven by the control unit 702.

With reference to FIG. 7, a network device 710 according to an embodiment of the present disclosure may be configured with a communication device 711, encryption device 712, and storage device 713.

The communication device 711 can transmit or receive data to/from other devices. The communication device 711 can transmit or receive an encrypted key or an encrypted profile. For this, the communication device 711 may include at least one communication module and antenna.

In various embodiments, if the network device 710 operates as a device including the encryption device 712 and the storage device 713, the communication device 711 can be installed in the network device 710. Alternatively, if the network device 710 is interpreted as a common concept of including the encryption device 712 and the storage device 713 configured separately, the communication device 711 can be installed in the encryption device 712 and the storage device 713 individually. In this case, the encryption device 712 and storage device 713 can transmit and receive data each other through the communication device 711.

The encryption device 712 may include a HSM or called HSM itself, and can perform encryption and decryption without exposing a password key.

The storage device 713 stores at least one profile. The storage device 713 may include at least one medium of a hard disk, RAM (Random Access Memory), SRAM (Static Random Access Memory), ROM (Read-Only Memory), EEPROM (Electrically Erasable Programmable Read-Only Memory), PROM (Programmable Read-Only Memory), magnetic memory, magnetic disk, and optical disk.

The network device 710 may be configured in a server form. In case that the network device 710 operates as a device including an encryption device 712 and a storage device 713, the network device 710 may include a separate control device for controlling the encryption device 712 and the storage device 713 centrally.

With reference to FIG. 7, a terminal 720 according to an embodiment of the present disclosure may configured with a communication unit 721, control unit 722, and eUICC 723.

The communication unit 721 can transmit or receive to/from other devices. The communication unit 721 can receive an encrypted key and an encrypted profile. For this, the communication unit 721 may include at least one communication module and antenna.

The control unit 722 can control each component of the terminal 720 to install a profile according to the present invention. The detailed operations of the control unit 722 are same as the above description.

An eUICC 723 is a UICC chip installed in the terminal 720, and performs functions of storing, managing, and deleting at least one profile. The profile includes data information such as one or more applications, subscriber authentication information, and telephone book.

The above embodiments of the present disclosure illustrated by the accompanying drawings have been suggested for easier understanding of the present disclosure and do not limit the scope of the present invention. Further, it will be understood by those skilled in the art that various changes in form and details may be made therein without departing from the spirit and scope of the present disclosure as defined by the appended claims and their equivalents.

The invention claimed is:

1. A method by a network device for installing a profile of an embedded universal integrated circuit card (eUICC) of a terminal, the method comprising:
   acquiring, from a profile generating server, a profile encrypted with a first security key and the first security key encrypted with a second security key, wherein the second security key is for mutual authentication between the profile generating server and the network device;

acquiring the first security key encrypted with a third security key corresponding to the eUICC; and transmitting the encrypted profile and the first security key encrypted with the third security key to the terminal having the eUICC, wherein, during a profile installation, the profile encrypted with the first security key is decrypted with the first security key and is installed in the eUICC.

2. The method of claim 1, wherein the profile generating server includes a subscription manager data preparation (SM-DP) server.

3. The method of claim 2, wherein the acquiring of the first security key encrypted with the third security key comprises:

decrypting the first security key encrypted with the second security key; and encrypting the first security key with the third security key.

4. The method of claim 1, wherein the acquiring of the profile encrypted with the first security key and the first security key encrypted with the second security key comprises:

receiving the profile encrypted with the second security key from the profile generating server;

decrypting the profile with the second security key; and encrypting the profile with the first security key.

5. The method of claim 4, further comprising:

transmitting the profile encrypted with the first security key and the first security key to the profile generating server, wherein the first security key is encrypted with the third security key by the profile generating server and transmitted to the eUICC.

6. The method of claim 5, wherein the profile encrypted with the first security key is transmitted to the eUICC in an application protocol data unit (APDU) type message.

7. The method of claim 1, wherein the acquiring of the profile encrypted with the first security key and the first security key encrypted with a second security key comprises:

receiving the profile encrypted with the first security key from the profile generating server.

8. The method of claim 7, wherein the transmitting of the encrypted profile and the first security key encrypted with the third security key comprises:

transmitting an eUICC list for installing profiles to the profile generating server, the eUICC list including the eUICC.

9. The method of claim 1, wherein the first security key is a random key generated for encrypting the profile.

10. The method of claim 1, wherein the third security key is a session key generated for encrypting the first security key corresponding to the eUICC.

11. A network device for installing a profile of an embedded universal integrated circuit card (eUICC) of a terminal, the network device comprising:

a transceiver; and at least one processor coupled with the transceiver and configured to control to:

acquire, from a profile generating server, a profile encrypted with a first security key and the first security key encrypted with a second security key, wherein the second security key is for mutual authentication between the profile generating server and the network device, acquire the first security key encrypted with a third security key corresponding to the eUICC, and control the transceiver to transmit the encrypted profile and the first security key encrypted with the third security key to the terminal having the eUICC, wherein, during a profile installation, the profile encrypted with the first security key is decrypted with the first security key and is installed in the eUICC.

12. The network device of claim 11, wherein the at least one processor is further configured to:

control to receive the profile encrypted with the first security key and the first security key encrypted with the second security key from the profile generating server, decrypt the first security key encrypted with the second security key, and encrypt the first security key with the third security key.

13. The network device of claim 11, wherein the at least one processor is further configured to:

control to receive the profile encrypted with the second security key from the profile generating server, decrypt the profile with the second security key, encrypt the profile with the first security key, and control the transceiver to transmit the profile encrypted with the first security key and the first security key to the profile generating server, and wherein the first security key is encrypted with the third security key by the profile generating server and transmitted to the eUICC.

14. The network device of claim 11, wherein the at least one processor is further configured to:

control to receive the profile encrypted with the first security key from the profile generating server, control to transmit an eUICC list for installing profiles to the profile generating server, the eUICC list including the eUICC, and control to receive the first security key encrypted with the third security key from the profile generating server.

* * * * *